United States Patent
Beard

[19]

[11] Patent Number: 6,055,419
[45] Date of Patent: Apr. 25, 2000

[54] RADIO MONITORING APPARATUS AND PROCEDURES

[75] Inventor: Joseph K. Beard, Greensburg, Ind.

[73] Assignee: Driver's Radio, Inc., Greensburg, Ind.

[21] Appl. No.: 09/010,769

[22] Filed: Jan. 22, 1998

[51] Int. Cl.[7] ........................................ H04B 1/14
[52] U.S. Cl. ............... 455/142; 455/150.1; 455/188.1; 455/188.2; 455/191.1; 455/575
[58] Field of Search ............................ 455/142, 150.1, 455/38.2, 77, 575, 79, 188.1, 188.2, 191.1, 161.1, 161.2, 161.3, 180.2, 132, 134, 133, 527; 340/825.5, 825.71, 825.73, 825.44

[56] References Cited

U.S. PATENT DOCUMENTS

| | | | |
|---|---|---|---|
| 3,886,453 | 5/1975 | Quintiliani et al. | 455/77 |
| 4,524,461 | 6/1985 | Kostanty et al. | 455/79 |
| 4,932,071 | 6/1990 | Arndt et al. | 455/38.2 |
| 5,068,918 | 11/1991 | Verheijen et al. | 455/38.2 |
| 5,189,413 | 2/1993 | Gaskill et al. | 340/825.44 |
| 5,537,674 | 7/1996 | Kishimoto et al. | 455/186.1 |
| 5,628,056 | 5/1997 | Grysiewicz et al. | 455/575 |
| 5,728,027 | 3/1998 | Sinaiko | 482/4 |

*Primary Examiner*—Lee Nguyen
*Assistant Examiner*—Isaak R. Jama
*Attorney, Agent, or Firm*—Robert A. Spray, Patent Attorney

[57] ABSTRACT

A dual-band radio monitoring apparatus which provides the reception of transmissions on commercial AM/FM frequency band(s) to be monitored and interrupted by transmission(s) on a controlling VHF/UHF frequency band (s), especially for use by motor vehicle racing fans so that they may have a continual AM/FM reception which is muted for reception of the controlling VHF/UHF transmission of conversation between the race car driver and his pit crew.

5 Claims, 1 Drawing Sheet

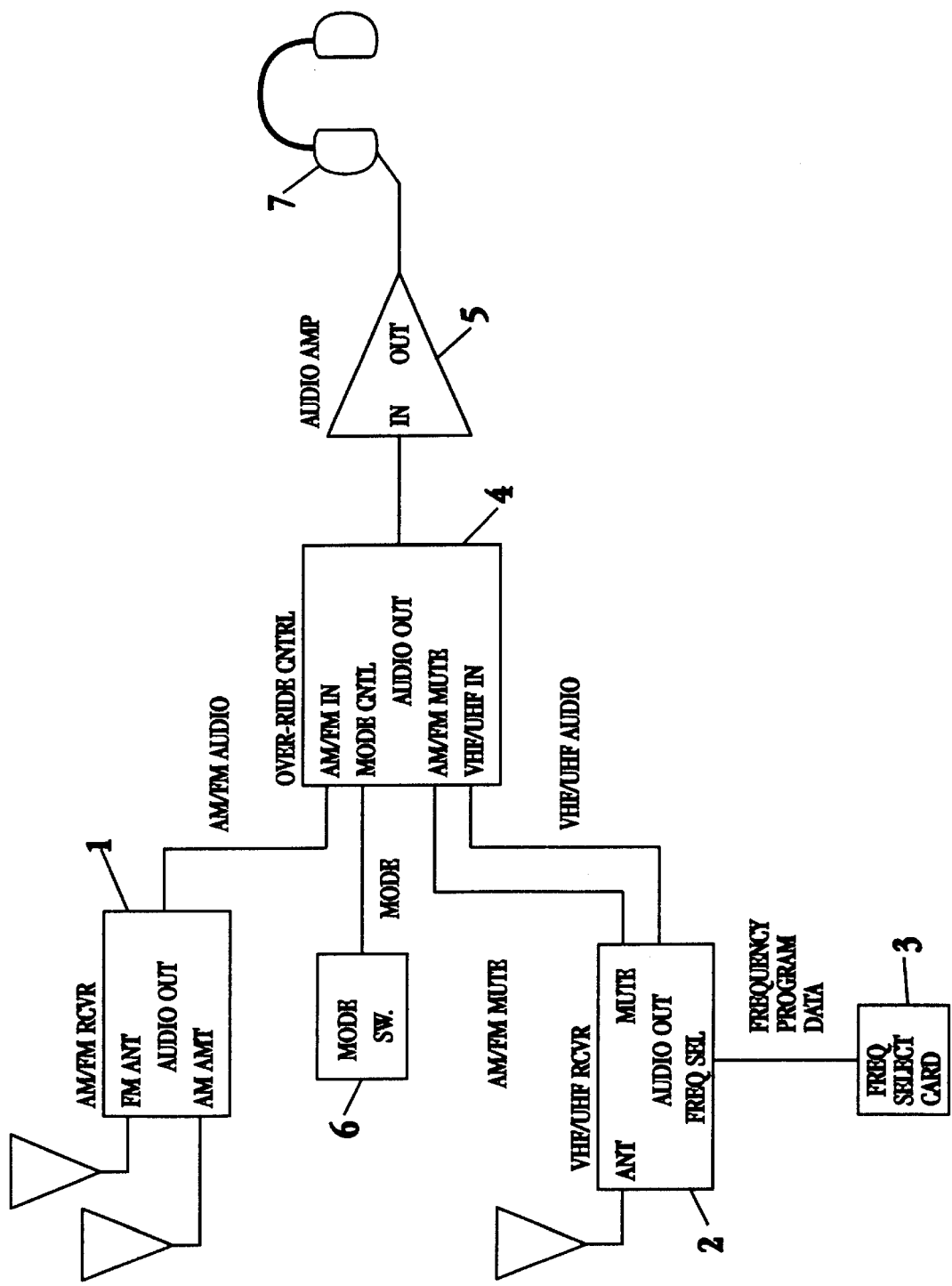

RADIO MONITORING APPARATUS AND PROCEDURES

FIELD OF THE INVENTION

The present invention relates to radio monitoring apparatus and procedures by which a radio transmission in an automobile racing event may be received in monitored form, with both a reception of one radio transmission and an automatic over-riding as to that transmission by a different transmission.

As illustrated by the apparatus and procedures described herein, such screening operativity can automatically provide a desired and advantageous enhancement of the informative and/or entertainment value of a primary transmission or broadcast by additional data and/or explanatory material being given by a secondary intermittent transmission.

This automatic monitoring provides that the overall reception as heard by the user is of considerably more advantage to the user than apparatus by which both radio transmissions are imparted to the user concurrently, in what would often be a confusing hodge-podge of different messages; and the automatic nature of the screening or monitoring avoids the loss of some secondary messages which although of intermittent nature would be likely considered to be more critically important at that particular moment than a more generalized primary text transmission.

Still more particularly, as the concepts are set forth herein, the present concepts provide a conventional AM/FM headphone radio operativity with the monitoring capability for the user to additionally scan/receive an intermittently emanated supplementary message or the like.

Such operability provides for the user the informative and educational value of the general race description broadcast integrated by intermittent supplementations of particular interest; and more particularly as herein set forth, a typical application is for spectators at an automobile racing event being able to enjoy both types of transmission, especially as herein set forth.

Such an event, for several years, has included two specific factors by which racing enthusiasts are able to receive particular information/entertainment value, even while being present at the race for its visual effect. These special factors, the significance of which has caused a need for several years for the present invention, are: (a) the broadcast of the race as a standard commercial radio broadcast which gives a generalized "call" of the race by public radio and (b) a means for the reception of the vital communications between a particular race driver and his team or pit crew.

The transmission of both types of communication, although both relating to the same subject matter, are significantly of a different nature, so different that it is relatively undesirable to have messages concurrently being heard, especially since the two-way communication between the driver and pit crew, although only intermittent, is inherently of a different nature, different text, different intensity, etc., from the primary radio broadcast which is usually of a continuing nature in terms of continuity and is also of a less individualistic nature as to a particular driver and his team.

As the popularity of automobile racing has increased, many fans have found additional entertainment in monitoring the two-way radio communications of the drivers with their crews. This practice is generally encouraged by race promoters who wish to grow the sport through greater fan enjoyment and participation.

Thus, it is that the present invention relates to apparatus and procedures by which this two-factor radio transmission is automatically achieved, making the overall enjoyment of the race particularly desirable to the spectator.

Problems Inherent as to the Provision of Multi-functional Radio Transmissions for an Automobile Racing Event Giving particular reference to an automobile race, a growing desire for spectators is to be able to hear the overall race broadcast transmission, which usually presents an overall and generally non-partisan running review and commentary, generally with overall race details, but for a spectator to also be able to "tune in" to special transmissions of the racing event, and particularly to the intense conversation between a particular driver and his pit crew.

For the spectator, who often has a favorite race driver or racing team, the spectator would prefer to listen to the individualistic transmission between that favored driver and his pit crew; but, since that individualistic conversation is of such an intermittent nature the spectator would desire to hear the overall race broadcast at all times when individualistic transmission of his favorite racing team is not being sent.

Accordingly, it is desirable that individual racing team transmission will be always at a "ready" stage for imparting the individualistic racing team chatter when it is happening, but to be silent during the other periods of time.

A particular problem of this monitored control is to provide that the intermittent individualistic transmission of a favored race team will block out the overall race description during only the precise and intermittent transmission of the racing team.

Similarly, the spectator's desire to hear the overall race broadcast means that it would automatically be reinstated to audible mode as soon as the specific monitoring of the individualistic transmission of the racing crew has stopped its monitoring effect.

Also, a problem is that the individualistic racing team chatter is of such a brief nature due to the busy duties of the driver, that it would not often be practical to rely upon any sort of a signal to the spectator to actuate the driver team transmission.

SUMMARY OF THE PRESENT INVENTION

In abbreviated summary as to the concepts of this invention, the invention provides a plural-function radio receiver tunable to operatively receive a plurality of frequencies, with one frequency providing automatic control of the other, particularly at an automobile racing event.

More particularly as to the desired utility of that general concept, the apparatus of the invention provides for advantageous and automatic control of the operative tuning of a radio appliance in its use in a special situation in which the user desires to receive the audible output of the radio device as that of a certain frequency, but to have the transmission of a signal of a different frequency upon certain intermittent and irregular occasions automatically.

Still more particularly, fans at automobile racing events would desire to have their radio devices tuned to a specific frequency to receive the audible overall transmission of a generalized nature, such as the commercial broadcast of the race, while watching the race but to have the additional entertainment value of monitoring specialized frequency messages such as the two-way radio communications of the drivers with their pit crews.

For some time, race promoters have let their private two-way communication to purposely become public as a means of creating more interest in the sport by greater fan enjoyment and sense of participation. Commercial businesses have accordingly begun to sell frequency lists giving the frequency used by each individual racing team, and scanners adapted to receive tunable frequency transmissions.

In spite of this desired and advantageous duality of reception, no devices known to the inventor have provided the combination of commercial reception of a descriptive "call" of the race in combination with that of the specialized reception of individual team usage, i.e., the interesting conversation of a team's driver and pit crew, especially providing that such conversation will be heard by the user in an automatic control mode of the device.

Further details are included in the more detailed description set forth herein.

Prior Art Capability and Motivations, as Helping to Show Patentability Here

In hindsight consideration of the present invention to determine its inventive and novel nature, it is not only conceded but emphasized that the prior art had details usable in this invention, but only if the prior art had had the guidance of the present concepts of the present invention, details of both capability and motivation.

That is, it is emphasized that the prior art had or knew several particulars which individually and accuumulatively help show the non-obviousness of this combination invention. E.g., a. The prior art has long had radio receivers and control devices for the selected reception of a plurality of frequencies;

b. The prior art has long had control devices, such as scanners, by which radio transmission can be selectively monitored;

c. The prior art has long known of the desirability of using control devices such as scanners to monitor radio transmissions including those of a nature of communications between remote personnel of teams such as that of race teams comprising a race car driver and the driver's pit crew;

d. The prior art of the radio and electronic industries has surely supposed or known that many customers have been and surely would be quite willing to purchase or rent radio receiver devices which would be adapted to provide controlled monitoring of racing teams' conversations;

e. The relative ease of manufacture and relative simplicity of radios and scanner type monitors have surely given their manufacturers ample incentive to have made modifications for commercial competitiveness in a competitive industry with huge sales prospects reasonably expectable;

f. The prior art has long had sufficient skill to make many types of radios and monitoring apparatus for radios, more than ample skill to have achieved the present invention, but only if the concepts and their combinations had been conceived;

g. The prior art has long known of the relative ease of operative interconnection of electronic devices by which one device can have effective control over the other;

h. Substantially all of the operational characteristics and advantages of details of the present invention, when considered separately from one another and when considered separately from the present invention's details and accomplishment of the details, are within the skill of persons of various arts, but only when considered away from the integrated and novel combination of concepts which by their cooperative combination achieves this advantageous invention;

i. The details of the present invention, when considered solely from the standpoint of construction, are relatively simple, and the matter of simplicity of construction has long been recognized as indicative of inventive creativity;

j. The prior art has long had radio receivers of headset form, including receivers which provide an audible presentation of differing frequency signals in the respective headset units; and k. Similarly, and a long-recognized indication of inventiveness of a novel combination, is the realistic principle that a person of ordinary skill in the art, as illustrated with respect to the claimed combination as differing in the stated respects from the prior art both as to construction and concept, is that the person of ordinary skill in the art is presumed to be one who thinks along the line of conventional wisdom in the art and is not one who undertakes to innovate.

Accordingly, although the prior art has had capability and motivation, amply sufficient to presumably give incentive to the development of specialized radio receivers according to the present invention, the fact remains that the present invention awaited the creativity and inventive discovery of the present inventor. In spite of ample motivation and capability shown by the illustrations herein, the prior art did not suggest this invention.

Prior Art as Particular Instances of Failure to Provide Advantageous Combination Apparatus by Which One Transmission is Monitored by Another Transmission at Automobile Racing Events In view of the inherent possibility of a combination device by which the transmission of two separate frequencies is achieved, it is difficult to realize that the prior art has failed in automobile racing use, even though radio circuitry formulation is quite commercial and competitive. Further, the persons of sufficient knowledge and skill to have achieved this combination surely include a multitude of manufacturers and users of radio devices capable of achieving this interrelated function and use, such that this combination invention would have come about if its concepts had been obvious as to racing event monitoring.

Widely known prior art known to the inventor is that of AM/FM receivers by which a different audible transmission is presented by each of the two headphone units of a two-unit headphone apparatus. Such dual-function apparatus has been known for many decades, worldwide, in stereophonic headset receivers; and scanner type circuit monitors have been long known, each independently, quite in contrast to a unitary headphone device providing a plurality of functions, and of changeable nature herein providing racing event enjoyment.

Moreover, the scanners are generally very expensive to purchase or rent. They are typically hand held with cords attaching the radio with headphones. Frequencies must be entered into the radio to receive communications. The user of a scanner can only monitor driver communications and not hear the call of the race from public radio broadcast.

The radio would incorporate standard AM/FM radio circuitry and scanner circuitry. The scanner circuit will be controlled with a squelch control. The AM/FM radio would have standard tuning and selector switches, all standard and commercially available items.

The user is provided to have the choice of monitoring, giving radio only, scanner only, radio with automatic cut-out from scanner, or scanner and radio combined.

In a desired embodiment, the scanner would use removable cards for frequency selection. Each card allows the listener to monitor the radio transmission of a particular team, by controlling the frequency of the scanner. Additional cards could be used to monitor multiple teams. These cards would preferably denote the car number and colors of a particular driver, which would allow for quick and easy recognition of the driver being scanned as to transmission with his team.

The frequency cards could be purchased separately from the radio headphone to allow for changes in frequency or desire to listen to additional drivers, and for other changes from time to time.

Particular apparatus of the prior art which has come to the inventor's attention after his invention was conceived consists of the following, all U.S. Patents:

| Ryan | 3,581,019 | 1971 |
| Lunquist | 3,745,467 | 1973 |
| Quintiliani, et al | 3,886,453 | 1975 |
| Baker | 3,962,644 | 1976 |
| Arai | 3,971,985 | 1976 |
| Hanson | 4,011,515 | 1977 |
| Koch | 4,057,760 | 1977 |
| Rogers | 4,105,974 | 1978 |
| Eilers, et al | 4,450,589 | 1984 |
| Kostanty, et al | 4,524,461 | 1985 |
| Imazeki, et al | 4,618,997 | 1986 |
| Relyea | 4,621,372 | 1986 |
| Howell, et al | 4,665,379 | 1987 |
| Costino | 4,792,792 | 1988 |
| Torres | 4,857,888 | 1989 |
| Porco | 4,873,712 | 1989 |
| Yoda | D324,385 | 1992 |
| Okumura, et al | D340,033 | 1993 |
| Hyogo | D342,946 | 1994 |
| Totsuka | D342,947 | 1994 |
| Yoshida, et al | 5,321,671 | 1994 |
| Tanaka | D351,171 | 1994 |
| Borchardt, et al | 5,410,735 | 1995 |
| Such | 5,457,751 | 1995 |
| Hanson | D369,167 | 1996 |

These illustrate the long-continuing inventorship of various achievements and combinations of circuitry, but none shows or suggests the present invention.

Summary of the Prior Art's Lack of Suggestions of the Concepts of the Invention's Combination In spite of all such factors of the prior art, the problem here solved awaited this inventor's present creativity. More particularly as to the novelty here of the invention as considered as a whole, the candid reference to the prior art uses and needs helps to show its contrast to the present concepts, and emphasizes the advantages, novelty, and the inventive significance of the present concepts as are here shown, particularly as to utility, economy and convenience of use as detailed herein.

Moreover, prior art articles known to this inventor which could possibily be adapted for this duty fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backward look into the prior art, especially since the prior art has long had much motivation as to details of the present invention and to its provisions.

And the existence of such prior art knowledge and related articles embodying such various features is not only conceded, it is emphasized; for as to the novelty here of the combination and of the invention as considered as a whole, a contrast to the prior art helps also to remind both the great variety of the various prior art articles and the needed attempts of improvement, and of the advantages and the inventive significance of the present concepts. Thus, as shown herein as a contrast to all the prior art, the inventive significance of the present concepts as a combination is emphasized and the nature of the concepts and their results can perhaps be easier understood.

Although varieties of prior art are conceded and ample motivation is shown and full capability in the prior art is conceded, no prior art shows or suggests details of the overall combination of the present invention as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

And the prior art's lack of an invention of a combination device achieving the convenience, economy, simplicity of use and other advantages of the present invention, which are goals only approached by the prior art, must be recognized as showing a long-felt need fulfilled.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

BRIEF DESCRIPTION OF THE DRAWING

The above description of the novel and advantageous invention is of somewhat introductory and generalized form. More particular details, concepts and features are set forth in the following and more detailed description of the preferred embodiment, taken in conjunction with the accompanying Drawing which is of somewhat schematic and diagrammatic nature for showing the inventive concepts, being generally a block diagram of the dual-band monitoring apparatus, illustrating the AM/FM receiver-circuitry and the VHF/UHF receiver circuitry, coupled together with the monitoring function according to the present invention.

DETAILED DESCRIPTION OF PREFERRED EMBODIMENT

Referring to the Drawing, the circuitry and its elements are shown as a block diagram for convenience of showing the inventive concepts which provide the advantageous monitoring system of this invention.

Beginning this Description with the AM/FM input, the AM/FM receiver 1 is designed to receive the standard commercial broadcasts on the frequencies 535 kHz to 1605 kHz (AM) and 88 MHz to 108 MHz (FM).

The transmissions received by this receiver 1 are generally unbroken in nature. This receiver is tuned in the known or normal manner with a tuning dial mechanically operating a variable capacitor; and, since the tuning of the receiver 1 is not limited to any certain portion of the AM/FM range, the user's choice is generally unlimited as to AM/FM pickup, even though the user would probably set the tuning for a station giving the call of the race.

A switch (not shown) allows the choice of the AM or FM broadcast bands, providing that the output of this receiver 1 is the desired audio frequency signal contained in the AM/FM transmission being desirably received.

Turning now to the operativity of the VHF/UHF receiver 2, it is provided to receive transmissions in any of the several VHF and UHF frequency bands which are used. The transmissions received by this receiver 2 are generally two-way in nature and are often broken by long periods of silence, this being the typical two-way communication between the race car driver and his pit crew.

The output of this receiver 2 is the audio frequency signal contained in the VHF or UHF transmission being received.

This receiver 2 is tuned by the digital electronic data stored on the Frequency Select Card 3.

The Frequency Select Card 3 is desirably loaded with the frequency-select information for one or more receive frequencies, for optional choice by the user, which frequencies the VHF/UHF receiver scans, in an embodiment providing scanning circuitry. That information in a preferred embodiment comprises a non-volatile-memory integrated circuit which stores the programming data for the reception of specific VHF/UHF frequencies; and the Card 3 is releasably carried by mounting means (not shown) carried by the framework which carries the receivers 1 and 2.

If the function mode is selected to allow scanning receiver operativity and the presence of RF energy (signifying an active transmitter) is detected on one of the scanned frequencies, the AM/FM MUTE signal is activated, causing the Over-Ride Control Switch 4 to block the AM/FM AUDIO signal and pass the VHF/UHF AUDIO signal through to the Audio Amplifier 5.

Conversely, if the desired use is to monitor only a single VHF/UHF frequency, the Select Card 3 is loaded with only the data to activate the VHF/UHF signal for the frequency being used by the specific driver/crew's conversation being monitored.

Regardless of whether the operativity is for scanning as between two or more scanning frequencies, or merely to receive the conversation of a single driver/crew conversation as controlled by the Select Card 3, the Audio Amplifier 5 amplifies the audio signal and drives the Headphones 7. The Mode Switch 6 control the function of the Over-Ride Switch 4.

Desirably there are three function modes selected by the Mode Switch: AM/FM audio (Over-Ride disabled), VHF/UHF audio (Over-Ride permanently active) and automatic Over-Ride on VHF/UHF receiver active.

Summary of Components and Operational Details and Their Advantages

The present invention as detailed herein has advantages in both concept and in component parts and features; for in contrast to other articles known to the inventor as to the prior art mentioned, the invention provides advantageous features which should be considered, both as to their individual benefit, and to whatever may be considered to be also their synergistic benefit toward the invention as a whole:

a. Made basically from a conventional AM/FM receiver and a scanner device;

b. Use is easy to learn;

c. Advantageous plural-receptiveness and convenient monitoring;

d. Bulk and weight of the plural-function apparatus are not necessarily much over that of a conventional headset receiver;

e. Economical of formation; accommodative of different monitoring control pieces for use at the same event or at subsequent events;

f. Easy to change promptly to a different monitored frequency to pick up the conversation of different monitored transmission; and g. Of practically infinite life.

Conclusions as to Inventive Combination

It is thus seen that a multi-function and automatically monitoring radio device, used according to the combination of inventive concepts and details herein set forth, provides novel concepts of a desirable and usefully advantageous article, yielding advantages which are and which provide special and particular advantages when used as herein set forth.

In summary as to the nature of the overall article's advantageous concepts, their novelty and inventive combination is shown by novel features of concept and construction shown here in advantageous combination and by the novel concepts hereof not only being different from all prior art known, even though other radios, various assemblies and scanners have been known and used for scores of years, but because the achievement is not what is or has been suggested to those of ordinary skill in the art, especially realistically considering this as a novel combination comprising components which individually are similar in nature to what is well known to most all persons, surely including most of the many makers and users of radios and scanner-monitoring devices for a great number of years throughout the entire world. No prior art component or element has even suggested the modifications of any other prior art to achieve the particulars of the novel concepts of the overall combination here achieved, with the special advantages which the overall combination article provides; and this lack of suggestion by any prior art has been in spite of the long worldwide use of various types of radio and monitoring equipment.

The differences of concept and construction as specified herein yield advantages over the prior art; and the lack of this invention by the prior art, as an inventive combination has been in spite of this invention's apparent simplicity of the construction once the concepts have been conceived, in spite of the advantages it would have given, and in spite of the availability of all of the materials to all persons of the entire world, and the invention's relatively non-technical and openly-visible nature.

Quite certainly this particular combination of prior art details as here presented in this overall combination has not been suggested by the prior art, this achievement in its particular details and utility being a substantial and advantageous departure from prior art, even though the prior art has had similar components separately for numbers of years.

Particularly is the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art of radios and monitoring equipment articles not achieving particular advantages here achieved by this combination.

Accordingly, it will thus be seen from the foregoing description of the invention according to the illustrative embodiment, considered with the accompanying drawings, that the present invention provides new and useful concepts of a novel and advantageous article, possessing and yielding desired advantages and characteristics in formation and use, and accomplishing the intended objects including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

What is claimed is:

1. A multi-band monitoring function receiver, comprising, in combination:
   (a) an AM/FM receiver for the AM/FM frequency band(s),
   (b) a scanning receiver for one or more frequencies in the VHF and/or UHF frequency band(s), and
   (c) means providing switching such that the reception of transmission(s) by the VHF/UHF scanning receiver is operative to mute and over-ride the reception of transmission(s) by the AM/FM receiver.

2. The multi-band receiver set forth in claim 1, which includes a mounting means, and wherein the switching of the received frequency or frequencies for the VHF/UHF scanning receiver is accomplished by means of a card which
   (a) carries a non-volatile-memory integrated circuit which stores the programming data for the reception of specific VHF/UHF frequencies,
   (b) the card being releasably carried by the mounting means.

3. The multi-band receiver set forth in claim 1, wherein the operation of the switching function is provided for selective reception allowance operativity which
   (a) allows AM/FM reception alone,
   (b) allows VHF/UHF reception along, or
   (c) allows AM/FM reception monitored by VHF/UHF reception.

4. A multi-band receiver as set forth in claim 1, which is provided as a belt-mounted unit allowing hands-free operation.

5. A multi-band receiver as set forth in claim 1, which is provided as a headphone unit allowing hands free operation.

* * * * *